US006981043B2

(12) United States Patent
Botz et al.

(10) Patent No.: US 6,981,043 B2
(45) Date of Patent: Dec. 27, 2005

(54) APPARATUS AND METHOD FOR MANAGING MULTIPLE USER IDENTITIES ON A NETWORKED COMPUTER SYSTEM

(75) Inventors: Patrick S. Botz, Rochester, MN (US); Patrick Jerome Fleming, Pine Island, MN (US); Timothy James Hahn, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 844 days.

(21) Appl. No.: 09/818,064

(22) Filed: Mar. 27, 2001

(65) Prior Publication Data

US 2002/0143909 A1    Oct. 3, 2002

(51) Int. Cl.[7] .............................................. G06F 13/00
(52) U.S. Cl. ...................... 709/225; 709/217; 709/227; 707/104
(58) Field of Search ............................... 709/217, 223, 709/225, 226, 227, 238; 707/10, 100, 104

(56) References Cited

U.S. PATENT DOCUMENTS

| 5,581,765 | A  | * | 12/1996 | Munroe et al. ............. 718/107 |
| 5,764,745 | A  | * | 6/1998  | Chan et al. ............. 379/221.13 |
| 6,157,953 | A  | * | 12/2000 | Chang et al. ............... 709/225 |
| 6,256,031 | B1 | * | 7/2001  | Meijer et al. ............... 345/854 |
| 6,353,621 | B1 | * | 3/2002  | Boland et al. ............... 370/467 |
| 6,360,222 | B1 | * | 3/2002  | Quinn ......................... 707/100 |
| 6,574,721 | B1 | * | 6/2003  | Christenson et al. ........ 711/209 |
| 6,643,685 | B1 | * | 11/2003 | Millard ....................... 709/206 |
| 6,708,170 | B1 | * | 3/2004  | Byrne et al. .................... 707/9 |
| 6,760,780 | B1 | * | 7/2004  | Chitturi et al. ............. 709/248 |
| 2002/0093857 | A1 | * | 7/2002 | Cole ........................... 365/200 |
| 2002/0133330 | A1 | * | 9/2002 | Loisey et al. .................. 703/27 |

OTHER PUBLICATIONS

Kormann, et al, "Risks of the Passport Single Signon Protocol", Computer Networks, The International Journal of Computer and Telecommunications Networking, vol. 33 (2000) Nos. 1-6 Jun. 2000, pp. 51-58.
http://www.iseriesnetwork.com/artarchive/index.cfm?fuse-action+viewarticle&CO_ContentID=19108&cha . . . , "Microsoft Looks to Ease Windows/iSeries Integration", dated Aug. 23, 2004; printed Aug. 31, 2004.

* cited by examiner

Primary Examiner—Viet D. Vu
(74) Attorney, Agent, or Firm—Martin & Associates, LLC; Derek P. Martin

(57) ABSTRACT

An apparatus and method allow a system administrator to manage multiple user identities in multiple user registries in different processing environments. An identity mapping mechanism is provided that includes a directory service that includes entries that reference user identities in the multiple registries, and that reference identity mappings between those entries. The identity mapping mechanism includes an interface defined by a plurality of APIs that allow accessing and correlating the multiple user identities and the identity mappings. A programmer can generate an application or tool that uses the identity mapping mechanism by calling the APIs in the interface. In this manner, administration of user identities occurs with the user as the primary focus, rather than the platform. In addition, a common tool can be used to manage the user identities of different environments, making administration of user identities in a heterogenous network more efficient and cost-effective.

27 Claims, 13 Drawing Sheets

Domain APIs

CreateDomain()
DeleteDomain()
ListDomains()
ChangeDomain()

Registry APIs

AddRegistry()
AddApplicationRegistry()
RemoveRegistry()
ListRegistries()
ChangeRegistry()

Mapping Identifier APIs

AddMappingIdentifier()
RemoveMappingIdentifier()
ChangeMappingIdentifier()
ListMappingIdentifiers()
GetMappingIdentifiers()

FIG. 19

Mapping Operation APIs

AddSourceAssociation()
AddTargetAssociation()
AddAdminAssociation()
RemoveAssociation()
ListIdentities()
GetTargetIdentities()

FIG. 20

System Operation APIs

JoinDomain()
LeaveDomain()
CreateUser(registryType,registryName,userName,data)
ChangeUser(registryType,registryName,userName,data)
DeleteUser(registryType,registryName,userName,data)
RetrieveUser(registryType,registryName,userName,data)
RetrieveUserDefinition(registryType,registryName,data)

FIG. 21

APPARATUS AND METHOD FOR MANAGING MULTIPLE USER IDENTITIES ON A NETWORKED COMPUTER SYSTEM

BACKGROUND OF THE INVENTION

1. Technical Field

This invention generally relates to computer systems and more specifically relates to networked computer systems.

2. Background Art

Since the dawn of the computer age, computer systems have evolved into extremely sophisticated devices, and computer systems may be found in many different settings. The widespread proliferation of computers prompted the development of computer networks that allow computers to communicate with each other. With the introduction of the personal computer (PC), computing became accessible to large numbers of people. Networks for personal computers were developed that allow individual users to communicate with each other.

Over time, different computer platforms have developed with different operating systems and software requirements. Examples of modern computer platforms include I-Series 400, AIX, 390A, (all developed by IBM Corp.) and Windows 2000 (developed by Microsoft). Tools and mechanisms have been developed that allow these different computer platforms to communicate with each other, notwithstanding their different operating systems.

Because the requirements of each operating system differ, each operating system typically maintains its own user registry. A user registry is a list of users and information, such as a user ID and password, that are used to authenticate a user when the user requests access to the network. Note that a user may be a human user, or may be a software process that is assigned a local user identity, such as a print server. Each platform typically has its own administrative tools that allow a system administrator to add, delete, or modify user identities in the user registry. With a heterogenous network that has several different operating systems, this means that the system administrator must learn and become proficient in several different tools that each handle identity management in their respective realms (i.e., platforms). In addition, because each user must have a user identity in the user registry for each platform the user wants to access, the user must have several user IDs and passwords for the different platforms on the network. The result is managing multiple user identities for the same user using different administration tools. This is a very inefficient result.

One way to avoid having multiple user identities for the same user is to force all applications and operating systems to share a common user registry. This approach may be viable in a homogenous environment (i.e., in a network that only has computers of the same platform type). In fact, this approach has been adopted by Microsoft in the Windows 2000 operating system. All applications for Windows 2000 typically share the user information that is in the operating system's registry. However, implementing this approach on a heterogenous network that includes several different platforms would require that each operating system and each application be re-written to access some common user registry. This is simply not a workable solution. Instead of forcing all operating systems and applications to access a common user registry, it would be preferable to provide a way to correlate user identities in the different user registries so an administrator can see the correlation between a user's different identities in the different platforms. This would allow operating systems and applications to be used without affecting their core logic. Without an apparatus and method for correlating different user identities in different environments that describe the same user, system administrators will be required to continue the inefficient process of manually tracking all of the user's identities in the different environments with different administration tools, resulting in high costs of administrating heterogenous networks.

DISCLOSURE OF INVENTION

According to the preferred embodiments, an apparatus and method allow a system administrator to manage multiple user identities in multiple user registries in different processing environments. An identity mapping mechanism is provided that includes a directory service that includes entries that reference user identities in the multiple registries, and that reference identity mappings between those entries. The identity mapping mechanism includes an interface defined by a plurality of APIs that allow accessing and correlating the multiple user identities and the identity mappings. A programmer can generate an application or tool that uses the identity mapping mechanism by calling the APIs in the interface. In this manner, administration of user identities occurs with the user as the primary focus, rather than the platform. In addition, a common tool can be used to manage the user identities of different environments, making administration of user identities in a heterogenous network more efficient and cost-effective.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 19 is a list of sample mapping identifier APIs in accordance with the preferred embodiments;

FIG. 20 is a list of sample mapping operation APIs in accordance with the preferred embodiments;

FIG. 21 is a list of sample system operation APIs in accordance with the preferred embodiments;

BEST MODE FOR CARRYING OUT THE INVENTION

Overview

Figure 1:
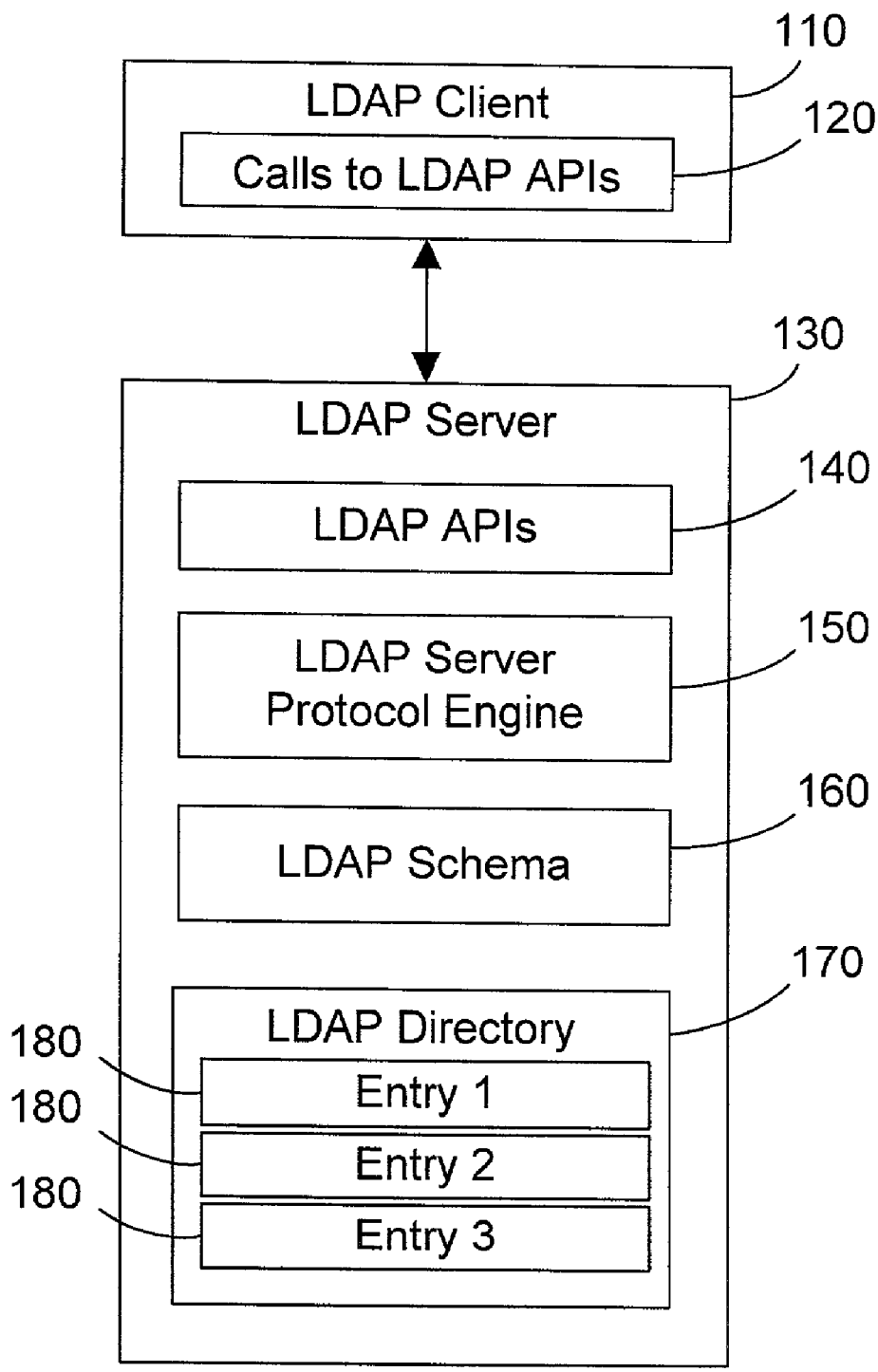
FIG. 1 is a block diagram of a prior art LDAP client and LDAP server.

The method and apparatus of the present invention uses a directory service to store and access local user identities and mappings between local user identities in different user registries on the network. For those individuals who are not familiar with directory services and user registries in a networked computing environment, a brief overview of relevant concepts is presented below.

LDAP-One Popular Directory Service

LDAP is the Lightweight Directory Access Protocol which is a known protocol for accessing a directory service in a computer network such as the Internet. The predecessor for LDAP is Directory Access Protocol (DAP), which is part of X.500, a standard for directory services in a network. DAP is very powerful, but has substantial overhead as well. Researchers at the University of Michigan developed LDAP in an attempt to "lighten up" DAP to provide many of its benefits without all of the associated overhead. Their attempts have met with resounding success as measured by the widespread acceptance by many companies of LDAP as a standard for networked directory services.

LDAP is a directory service that runs over Transmission Control Protocol/Internet Protocol (TCP/IP). The LDAP directory service follows a client/server model. One or more LDAP servers contain the directory data. An LDAP client connects to an LDAP server and makes a request. The server responds with a reply, or with a pointer (or referral) to another LDAP server. Because LDAP is a directory service, rather than a database, the information in an LDAP directory is usually descriptive, attribute-based information. LDAP users generally read the information in the directory much more often than they change it. Updates are typically simple, all-or-nothing changes. Common uses of LDAP directories include online telephone directories and e-mail directories.

The LDAP information model is based on an "entry", which contains information about some object. Entries are typically organized into a specified tree structure, the organization of which is defined by a schema. LDAP defines a number of directory service operations with respect to the tree and data contained therein including authentication, search and retrieval, entry addition/deletion, and entry modification.

In an LDAP directory, an entry is a collection of attributes that has a name, called a distinguished name (DN). The DN is used to refer to the entry unambiguously. Each of the entry's attributes has a type and one or more values. The types are typically mnemonic strings, like "cn" for common name or "mail" for an e-mail address. The values depend on what type of attribute it is. For example, a mail attribute might contain a text e-mail address, while a jpegPhoto attribute would contain a photograph in binary JPEG/JFIF format.

LDAP allows control over which attributes are required and allowed in an entry through the use of a special attribute called objectclass. The values of the objectclass attribute determine the schema rules the entry must obey. An entry is referenced by its distinguished name, which is constructed by taking the name of the entry itself (called the relative distinguished name, or RDN) and concatenating the names of its ancestor entities. Details of LDAP are available in W. Yeong, T. Howes, and S. Kille, "Lightweight Directory Access Protocol", Network Working Group, Request for Comments: 1777, March 1995.

An example of a known LDAP server 130 coupled to an LDAP client 110 is shown in FIG. 1. LDAP client 110 includes calls 120 to LDAP APIs 140, which provide the interface for communicating with the LDAP server 130. LDAP APIs 140 include functions that allow creating, deleting, and modifying entries in the LDAP directory. In addition, LDAP APIs 140 include the capability of searching the entries. A "bind" operation initiates a protocol session between a client 110 and a server 130.

LDAP server 130 includes LDAP server protocol engine 150, which enforces the specified protocol for communicating with LDAP server 130. LDAP schema 160 defines the layout and contents of each entry in the LDAP directory and how each entry is related to each other entry.

LDAP directory 170 contains a plurality of entries 180. These entries can have different forms depending on their relationship to the other entries as defined in the LDAP schema 160. For example, one entry may represent a company, while another entry may represent an employee of the company. Entries 180 are typically in cleartext form and may therefore be easily read by the user or application that accesses them. Note that the term "user" in this context is not limited to users, but could include applications, other programs, objects, or any other entity capable of accessing an entry in the LDAP directory.

User Registries in a Computer Network

Figure 2:
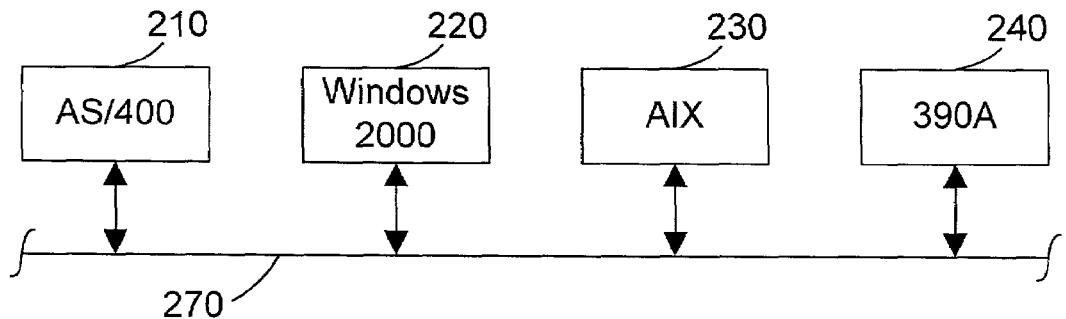
FIG. 2 is a block diagram of a prior art network that includes multiple different environments.
Figure 3:
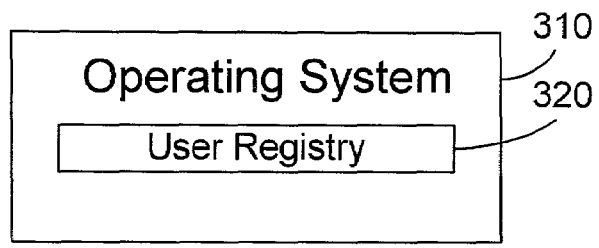
FIG. 3 is a block diagram of a prior art operating system that includes its own user registry.
Figure 4:
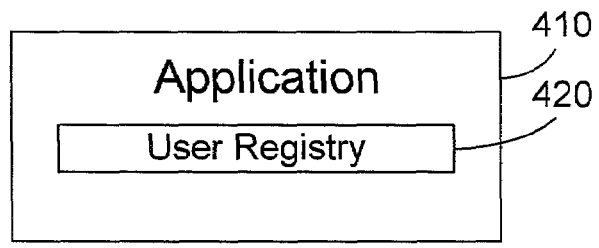
FIG. 4 is a block diagram of a prior art application that includes its own user registry.

Referring to FIG. 2, a network 270 is used to interconnect computer systems that are running different operating systems (referred to herein as "platforms"). Examples of known platforms are shown in FIG. 2, and include an AS/400 platform 210, a Windows 2000 platform 220, an AIX platform 230, and a 390A platform 240. As shown in FIG. 3, each of the operating systems 310 in these platforms contain a user registry 320. Note, however, that the user registry in one operating system is not accessible by other operating systems. In addition to user registries for each platform as shown in FIG. 3, certain applications 410 may also contain their own dedicated user registries 420, as shown in FIG. 4. For the sake of clarity in the discussion herein, operating systems and applications are lumped together into a common term "environment". Thus, a user registry for a particular environment is broadly construed to mean a user registry that is dedicated to a particular operating system or application.

Figure 5:
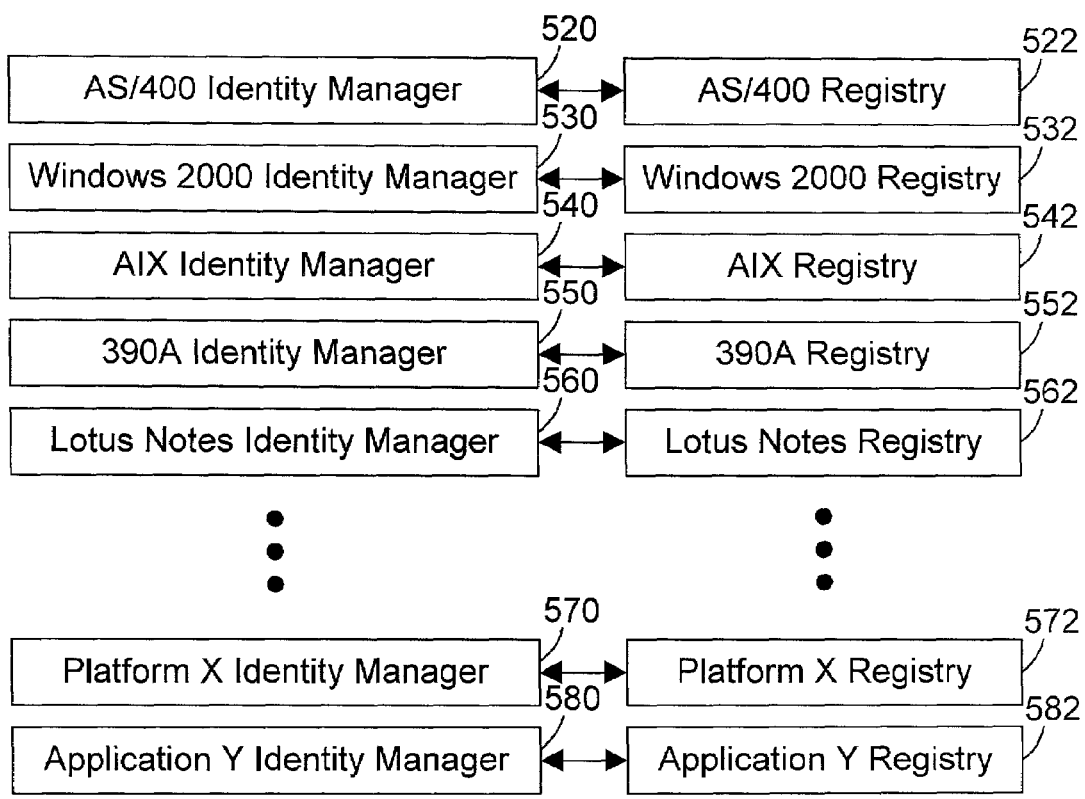
FIG. 5 is a block diagram that shows that each user registry in each environment has a corresponding identity manager for managing the user identities in the user registry.

In the prior art, administration of the different user registries is done via a special software tool that is unique for each environment. As shown in FIG. 5, the AS/400 registry 522 has its own AS/400 identity manager 520. The Windows 2000 registry 532 has its own Windows 2000 identity manager 530. Similarly, each of the other registries 542, 552, 562, 572 and 582 have their respective identity managers 540, 550, 560, 570 and 580. Note that there is no known way for any identity manager to access any other registry other than its own registry.

The identity managers are shown in FIG. 5 to conceptually illustrate that each registry has its own tool for performing administration functions on the registry. The actual name of the software tool and their respective complexities and functions vary greatly. The identity managers in FIG. 5 are shown in a simplified manner to indicate that each environment that has a registry also has an identity manager of some type to manage the user identities stored in its user registry.

DETAILED DESCRIPTION

The present invention solves the problem of having dedicated tools to manage multiple user registries on a network by providing a common framework for accessing user registries in different environments that includes mappings between user identities in different registries that represent the same user. In addition, the present invention provides mappings between local user identities in different user registries. This approach does not try to force all operating systems and applications to use a single user registry, and does not greatly change operating systems and application. The present invention recognizes the value in having different user registries in different environments, and provides the infrastructure for correlating multiple user identities in these different environments to a single user. One of the principal advantages of the identity manager of the present invention is that the user registries can be administered from the viewpoint of the user, rather than from the viewpoint of each individual environment and their respective user identities. In addition, a user may enter security information for one local user identity, and an operating system or application may use the identity mapping mechanism of the present invention to determine corresponding security information on a different platform or application. This corresponding security information can be used with the authorization mechanisms provided by the different platform or application.

Figure 6:
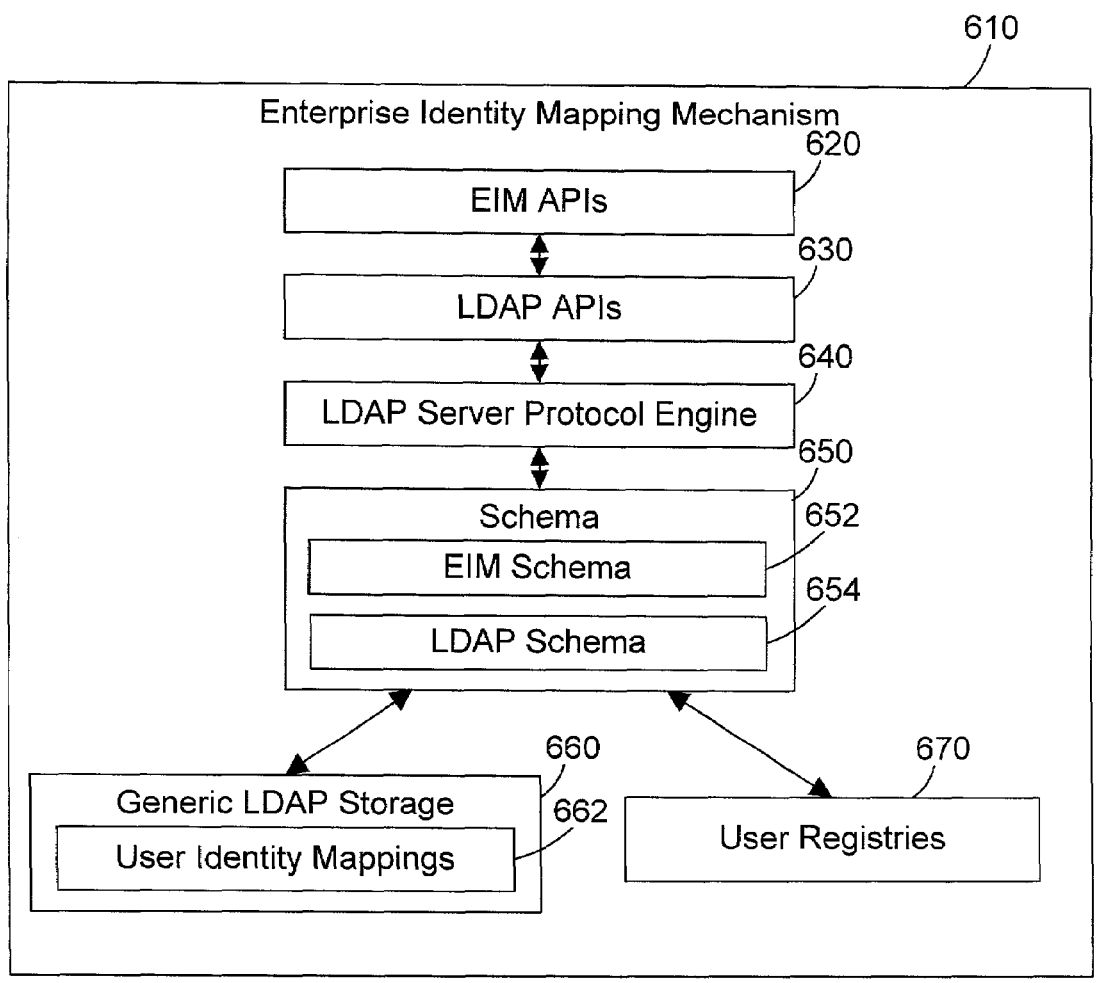
FIG. 6 is a block diagram of an identity mapping mechanism in accordance with the preferred embodiments.

Referring now to FIG. 6, an enterprise identity mapping mechanism 610 in accordance with the preferred embodiments is built upon an LDAP directory service. Enterprise identity mapping (EIM) application programming interfaces (APIs) 620 provide an interface to the enterprise identity mapping mechanism 610 that can be called to access information in the individual user registries 670 in each environment, and to access user identity mappings 662 that are stored in a generic LDAP storage 660. EIM APIs 620 interact with LDAP APIs 630 to translate the functions defined by the EIM APIs 620 into one or more function calls to the LDAP APIs 630. Note that in the preferred embodiments, EIM APIs 620 encapsulate the LDAP directory service, making its existence and function largely unknown to the user. The user simply invokes the appropriate EIM API 620, and all of the translation to the corresponding LDAP APIs 630 is done under the covers.

LDAP APIs 630 are the interface for the LDAP server protocol engine 640, which controls how information is stored and retrieved in the LDAP directory service. A schema 650 is defined that includes EIM schema 652 and LDAP schema 654. LDAP schema 654 dictates the structure of the entries and their relationship with one another in the generic LDAP storage 660. EIM schema 652 dictates how the information in the user registries 670 is accessed, and also defines global identifiers, and the mappings between the local user identities and the global identifiers. LDAP server protocol engine 640 performs operations on the user identity mappings 662 within the generic LDAP storage 660 and on the user registries 670 by using information in the EIM schema 652 and LDAP schema 654.

Figure 7:
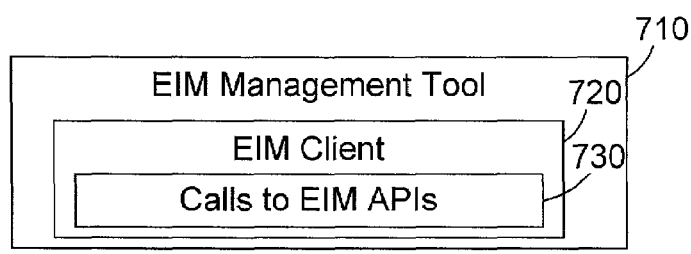
FIG. 7 is a block diagram of an identity management tool that can be programmed to manage the identities of users in a heterogenous network environment by invoking the APIs in the identity mapping mechanism of FIG. 6.

The enterprise identity mapping mechanism 610 of FIG. 6 provides a powerful tool for accessing user identities in different environments, and for mapping between different user identities in different environments that correspond to the same user. One sample application that could be built using the enterprise identity mapping mechanism 610 of FIG. 6 is an enterprise identity mapping (EIM) management tool 710, as shown in FIG. 7. EIM management tool 710 includes an EIM client 720 that includes calls 730 to the EIM APIs (620 in FIG. 6). Because the logic for accessing user identities in different registries and for correlating user identities in different registries to a common user are provided by the enterprise identity mapping mechanism 610 (FIG. 6), the EIM management tool 710 need only invoke the appropriate EIM APIs 620 to retrieve user identity information from a selected user registry or to correlate user identity information from two different registries that correspond to the same user. An EIM management tool 710 can thus be generated relatively quickly due to the support and sophistication of the logic within the enterprise identity mapping mechanism 610.

Figure 8:
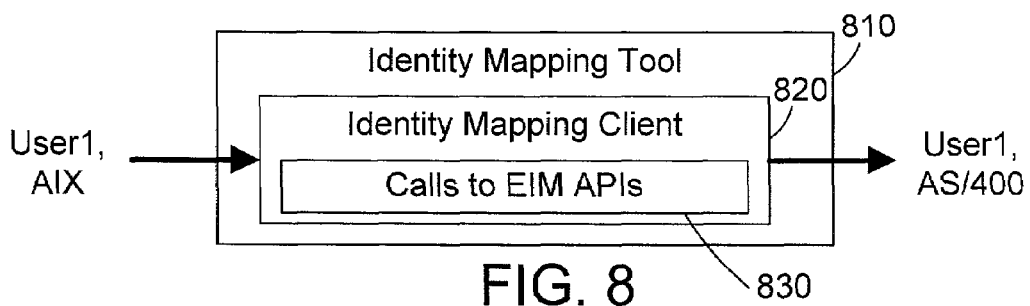
FIG. 8 is a block diagram of an identity mapping tool that can be programmed to indicate the correlation between different user identities in different user registries in a heterogenous network environment by invoking the APIs in the identity mapping mechanism of FIG. 6.

Another type of tool that could use the enterprise identity mapping mechanism 610 is an identity mapping tool 810, as shown in FIG. 8. The identity mapping tool 810 suitably includes an identity mapping client 820 that includes calls 830 to the EIM APIs 620. The identity mapping tool 810 can be used to correlate a user identity in one environment to a corresponding user identity for the same user in a different environment. Thus, as shown in FIG. 8, the identity mapping client 820 can take as input one user ID, such as the ID for User1 in the AIX environment, and by calling the EIM APIs 620 can provide the corresponding user ID for User 1 in the AS/400 environment. Of course, the identity mapping function shown in FIG. 8 would also be provided within the EIM management tool 710 of FIG. 7 as well, but in addition could be a separate function as shown in FIG. 8.

Figure 9:
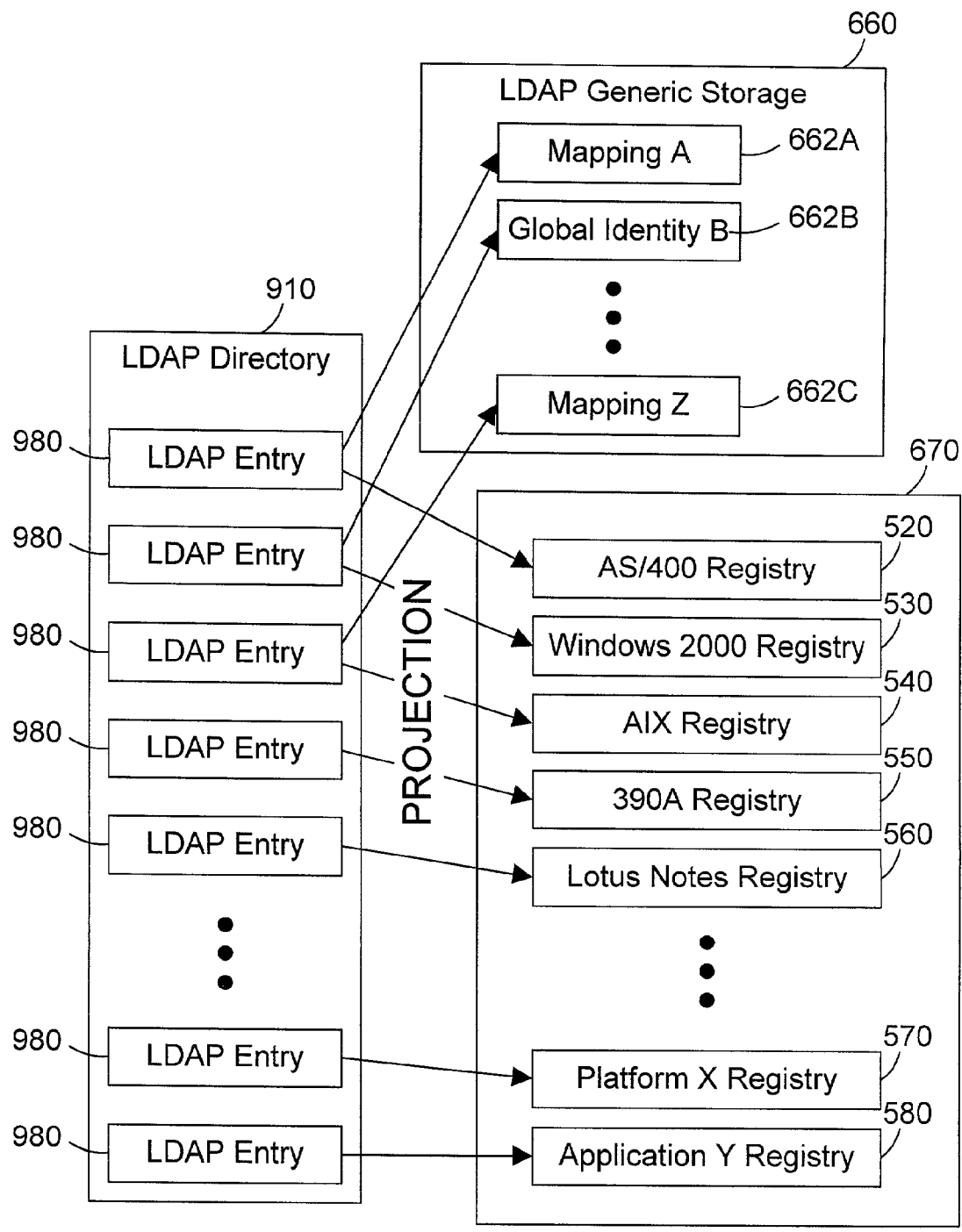
FIG. 9 is a block diagram showing how the logical view of the LDAP directory maps to the underlying data sources that are represented in the entries of the LDAP directory.

FIG. 9 shows how the logical view of the LDAP directory is mapped to the information that the LDAP protocol server can access. The LDAP directory 910 logically appears to be a number of entries 980 that all reside in a common store. Note, however, that under the covers the information in an LDAP directory may reside in different locations. For example, the mapping information between user identities is contained within attributes that are stored in LDAP generic storage 660, as shown in FIG. 9. Note, however, that the information in the user registries 670 is accessed where they reside using an LDAP concept known as "projection". Projection allows memory outside of the LDAP generic storage 660 to be accessed as if it resided in the LDAP generic storage 660. The preferred embodiments use projection to access information in local user registries (where they reside on their respective platforms) rather than copying the local user registry information to LDAP generic storage 660. As soon as data from a user registry is copied, data coherency issues arise. By using projection to access information in the user registries directly from the registries themselves, the preferred embodiments avoid data coherency issues that would arise from copying the user registry information.

The projection of the local user registry information into LDAP is suitably done by a back-end (not shown) to the user identity mapping mechanism that is provided specifically to communicate with the specific types of registries present in a particular networked computer system. This back end could be provided in conjunction with the identity mapping mechanism, or could be provided separately.

Figure 10:
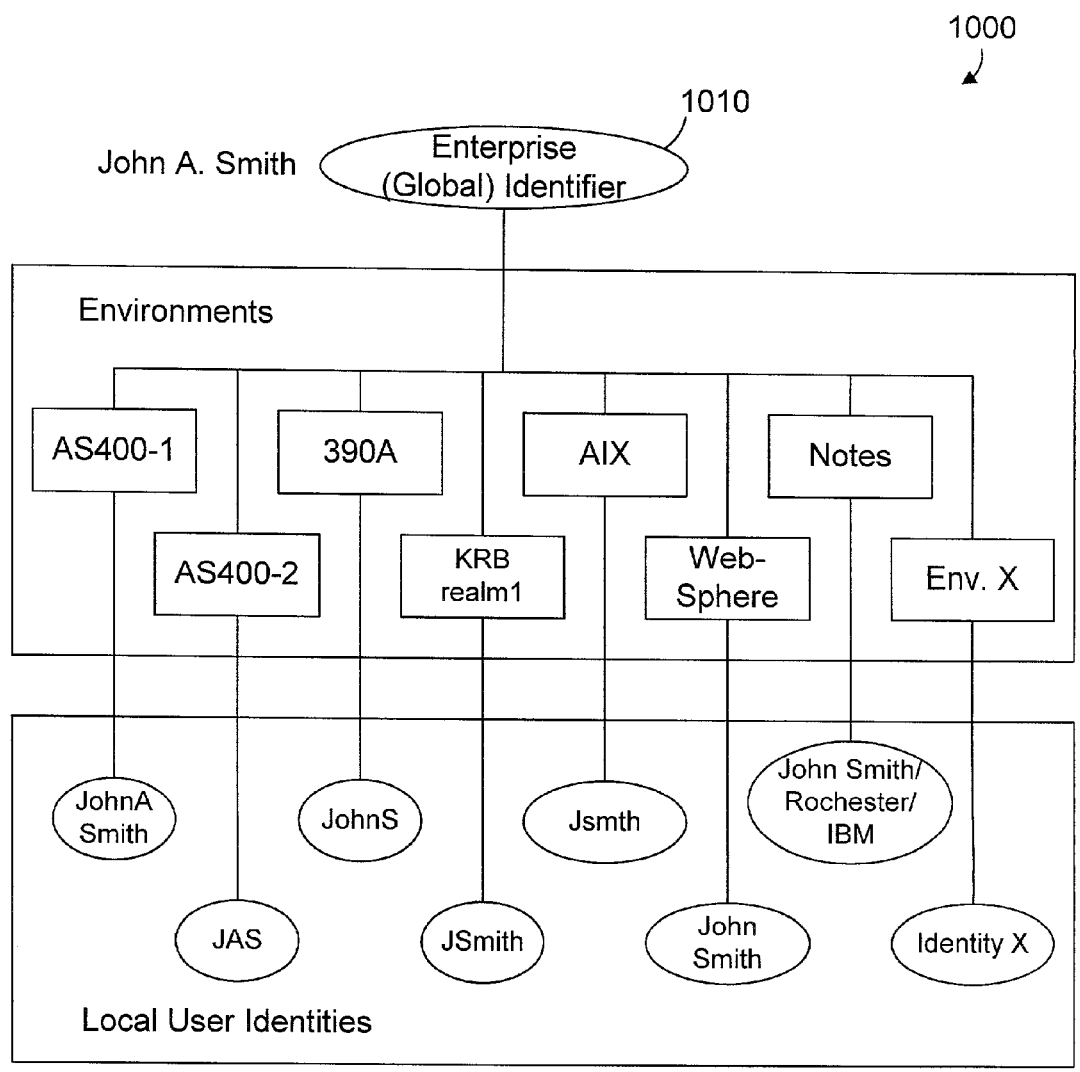
FIG. 10 is a block diagram of a tree graph that shows the relationship between a user's enterprise identifier and the user's various local user identities.

The tree diagram of FIG. 10 graphically illustrates a significant advantage of the preferred embodiments. Instead of managing multiple user registries using different administration tools (as shown in FIG. 5), the system administrator can now manage users. We assume that John A. Smith is the name of a user for a specific enterprise that has an enterprise identifier "John A. Smith" 1010. The term "global identifier" is used herein interchangeably with "enterprise identifier", and both represent a single identifier that is global across the entire enterprise. Now we see from FIG. 10 how the preferred embodiments allow the system administrator to correlate the single global identifier 1010 to several different local user identities in different user registries. We assume that this user has a local user identity JohnASmith in the AS400-1 registry; a local user identity of JAS in the AS400-2 user registry; a local user identity JohnS in the 390A user registry; a local user identity of Jsmith in the user registry for the Kerberos realm known as KRB realm1; a local user identity of Jsmth in the AIX user registry; a local user identity of John Smith in the Web-Sphere user registry; a local user identity of John Smith/Rochester/IBM in the Notes user registry; and a local user identity Identity X in another hypothetical user registry called Env. X. We now see from the tree graph of FIG. 10 how the local user identities correlate to each other for this user John A. Smith.

Figure 11:
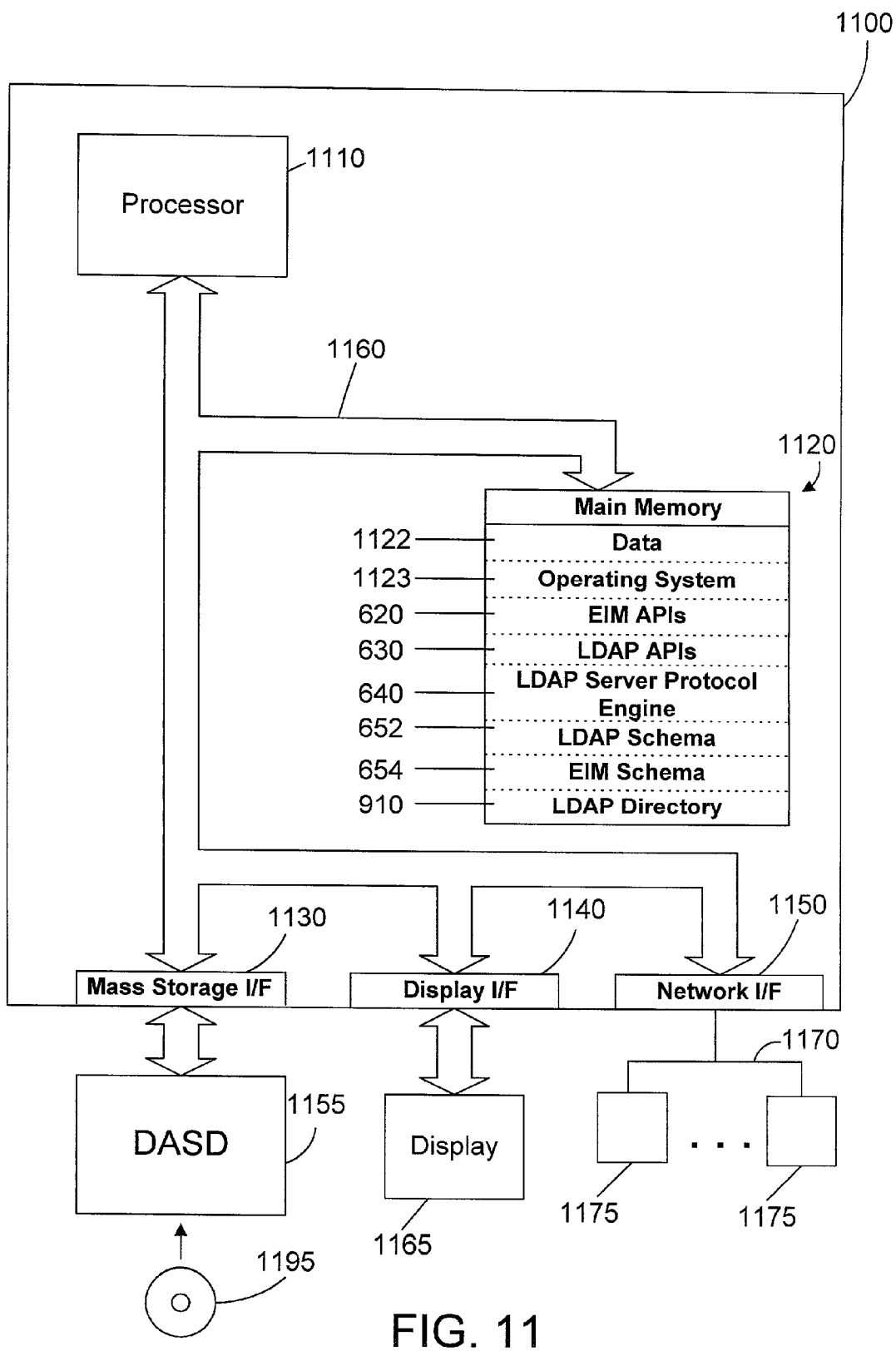
FIG. 11 is an apparatus in accordance with the preferred embodiments.

Referring now to FIG. 11, one specific implementation of a computer system in accordance with the preferred embodiments is an IBM iSeries 400 computer system 1100 (which was previously known as the AS/400 computer system). Computer system 1100 comprises a processor 1110 connected to a main memory 1120, a mass storage interface 1130, a display interface 1140, and a network interface 1150. These system components are interconnected through the use of a system bus 1160. Mass storage interface 1130 is used to connect mass storage devices (such as a direct access storage device 1155) to computer system 1100. One specific type of direct access storage device is a read/write CDROM drive, which may store data to and read data from a CDROM 1195.

Main memory 1120 in accordance with the preferred embodiments contains data 1122, an operating system 1123, EIM APIs 620, LDAP APIs 630, LDAP server protocol engine 640, LDAP schema 654, EIM schema 652, and LDAP directory 910. Computer system 1100 utilizes well known virtual addressing mechanisms that allow the programs of computer system 1100 to behave as if they only have access to a large, single storage entity instead of access to multiple, smaller storage entities such as main memory 1120 and DASD device 1155. Therefore, while data 1122, operating system 1123, EIM APIs 620, LDAP APIs 630, LDAP server protocol engine 640, LDAP schema 654, EIM schema 652, and LDAP directory 910 are shown to reside in main memory 1120, those skilled in the art will recognize that these items are not necessarily all completely contained in main memory 1120 at the same time. It should also be noted that the term "memory" is used herein to generically refer to the entire virtual memory of computer system 1100, as well as the entire virtual memory of the networked computer system of which computer system 1100 is a part.

Data 1122 represents any data that serves as input to or output from any program in computer system 1100. Operating system 1123 is a multitasking operating system known in the industry as OS/400; however, those skilled in the art will appreciate that the spirit and scope of the present invention is not limited to any one operating system.

Processor 1110 may be constructed from one or more microprocessors and/or integrated circuits. Processor 1110 executes program instructions stored in main memory 1120. Main memory 1120 stores programs and data that processor 1110 may access. When computer system 1100 starts up, processor 1110 initially executes the program instructions that make up operating system 1123. Operating system 1123 is a sophisticated program that manages the resources of computer system 1100. Some of these resources are processor 1110, main memory 1120, mass storage interface 1130, display interface 1140, network interface 1150, and system bus 1160.

EIM APIs 620 are the application programming interfaces provided by the preferred embodiments that allow correlating local user identities in different user registries to each other. LDAP APIs 630 represents the generic set of LDAP APIs that are provided as part of LDAP for accessing information in the LDAP directory 910. LDAP server protocol engine 640 represents the generic LDAP server protocol engine provided with LDAP. LDAP schema 654 is the part of the schema that defines LDAP itself. EIM schema 652 is the part of the schema that defines entries in the LDAP directory that correspond to the user registries and local user identities within those registries, along with other information pertinent to implementing the preferred embodiments. LDAP directory 910 represents a logical view that has a plurality of entries. Note, however, that the logical view may map to different data locations as shown in the figure and associated text for FIG. 9.

Although computer system 1100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 1110. However, those skilled in the art will appreciate that the present invention applies equally to computer systems that simply use I/O adapters to perform similar functions.

Display interface 1140 is used to directly connect one or more displays 1165 to computer system 1100. Display 1165 may be simple display devices or fully programmable workstations, and are used to allow system administrators to communicate with computer system 1100.

Network interface 1150 allows computer system 1100 to send and receive data to and from any network 1170 to which the computer system may be connected, to communicate with one or more computer systems 1175 that are coupled to the network 1170. Network 1170 may be a local area network (LAN), a wide area network (WAN), or more specifically the Internet. Suitable methods of connecting to the Internet include known analog and/or digital techniques, as well as networking mechanisms that are developed in the future. Many different network protocols can be used to implement a network. These protocols are specialized computer programs that allow computers to communicate across a network. TCP/IP (Transmission Control Protocol/Internet Protocol), used to communicate across the Internet, is an example of a suitable network protocol. The preferred embodiments expressly extend to a networked computer system that includes a plurality of different processing environments (i.e., platforms and applications) on the network.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as CDROM (e.g, 1195 of FIG. 11) and floppy disks, and transmission type media such as digital and analog communications links.

Figure 12:
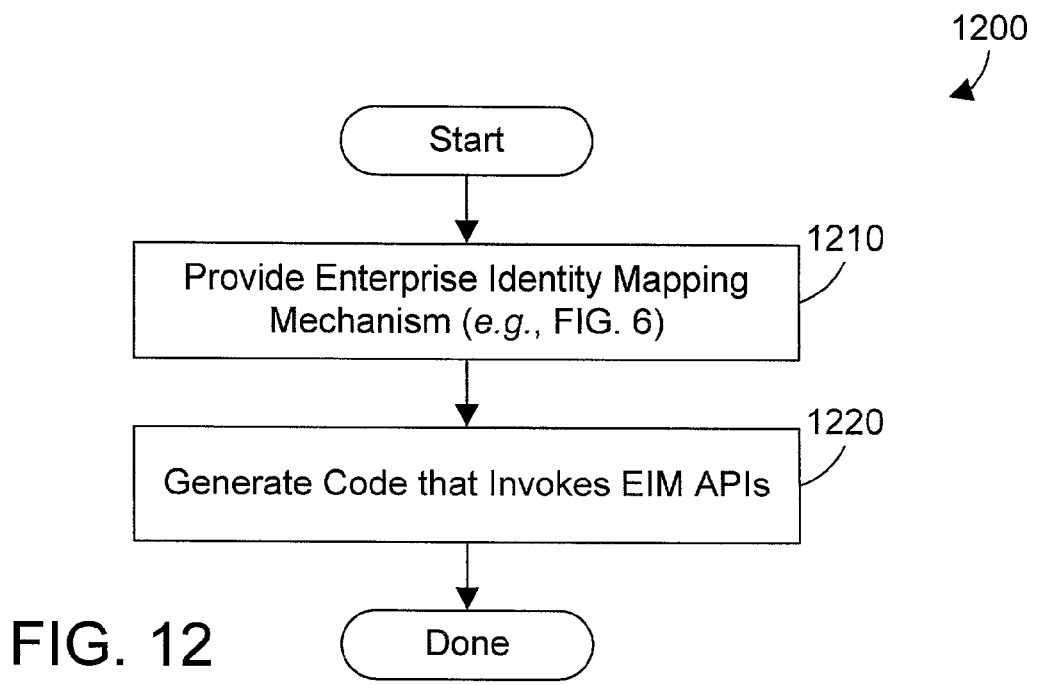
FIG. 12 is a flow diagram of a method in accordance with the preferred embodiments for generating a software tool that can correlate different user identities in different user registries in a heterogenous network environment.

Referring now to FIG. 12, a method 1200 in accordance with the preferred embodiments allows using the identity mapping mechanism to correlate local user identities in different local user registries. First, the enterprise identity mapping mechanism is provided (step 1210). A programmer can then generate code that invokes the EIM APIs (step 1220) to create, correlate and manage the local user identities in different user registries, and to determine the relationships between the local user identities for a particular user.

Figure 13:
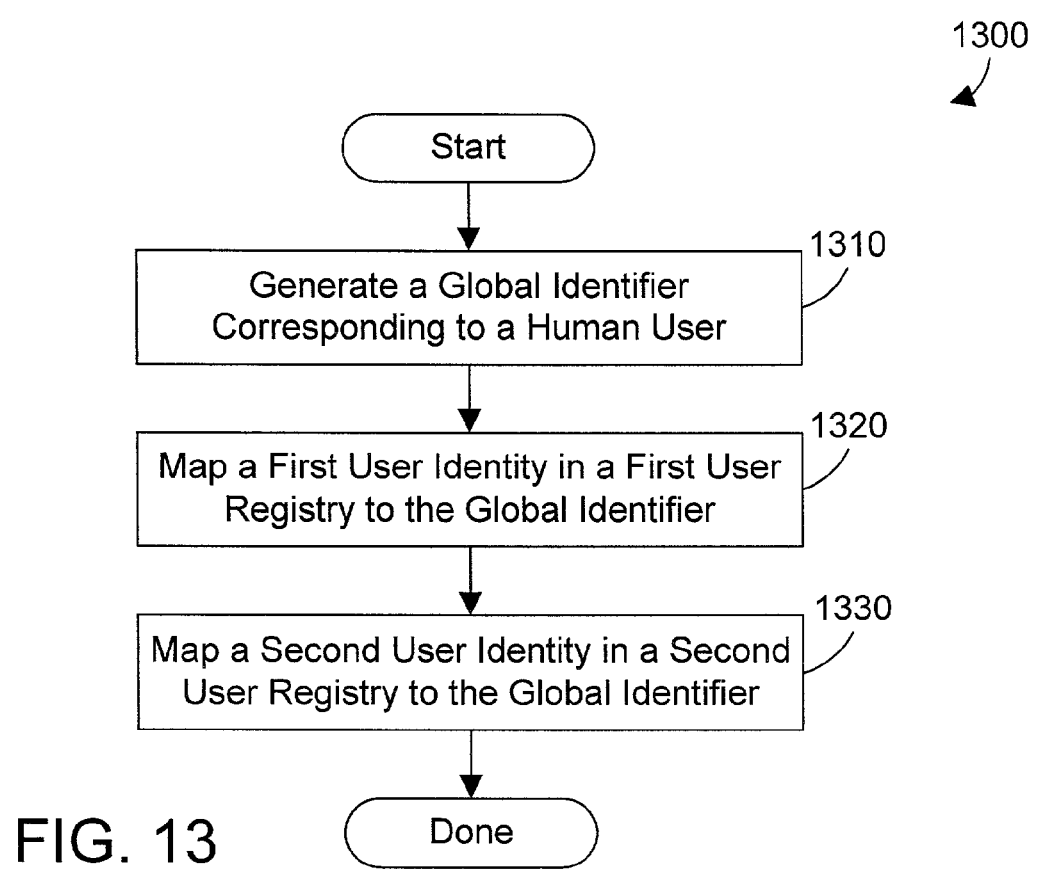
FIG. 13 is a flow diagram of a method in accordance with the preferred embodiments for mapping between two user identities in two different registries.

One specific way to correlate local user identities in different user registries uses a method 1300 as shown in FIG. 13. A global identifier is generated that corresponds to a user (step 1310). We assume for this example that this user has a first user identity in a first user registry, and a second user identity in a second user registry. The first user identity is mapped to the global identifier (step 1320). The second user identity is also mapped to the global identifier (step 1330). Because both local user identities are now mapped to a common global identifier, the mapping between these two local user identities can be easily determined.

Figure 14:
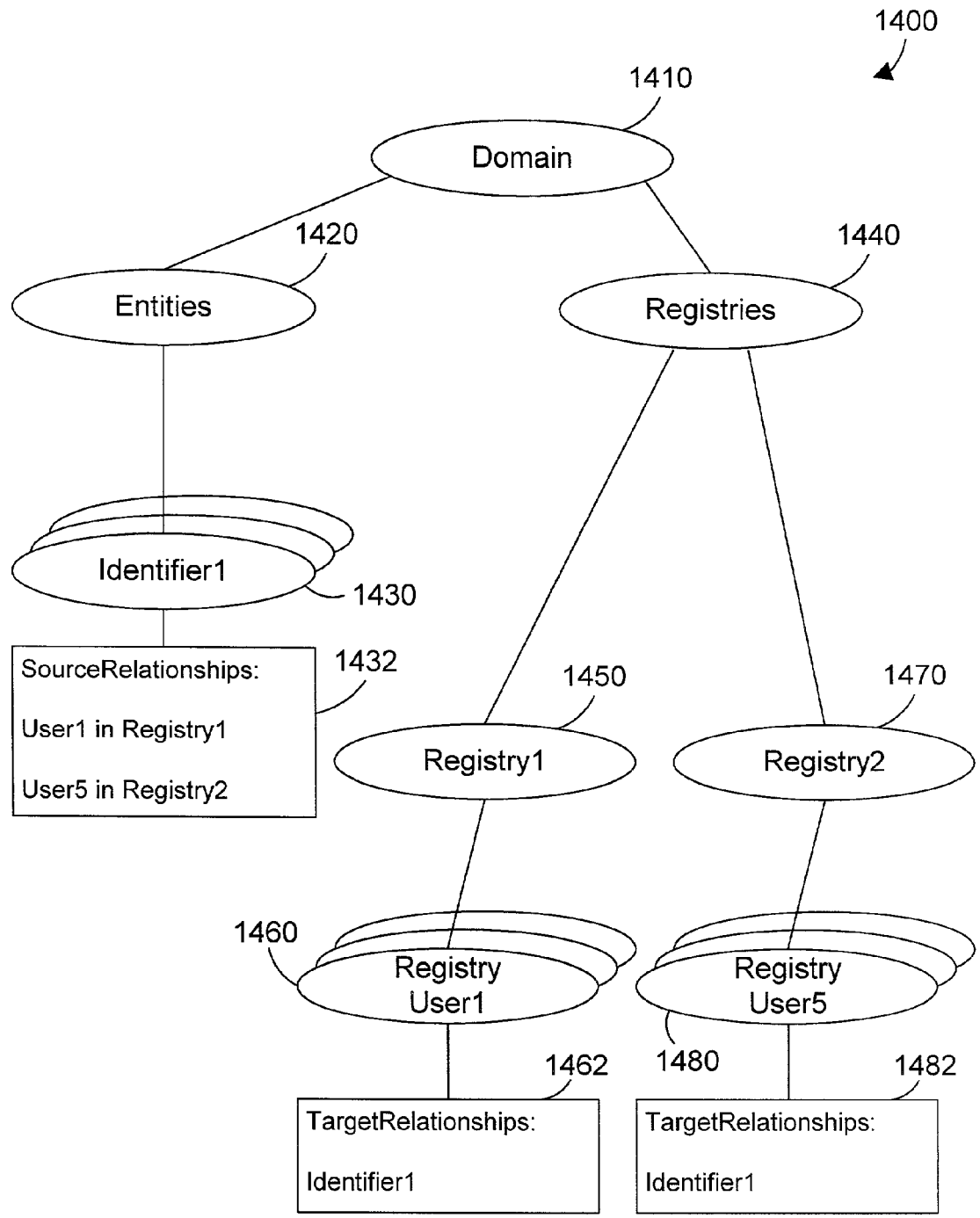
FIG. 14 is a diagram of a Directory Information Tree (DIT) that is defined by the EIM schema for the LDAP directory of the preferred embodiment.

One specific implementation for an EIM schema 652 (as shown in FIG. 6) in accordance with the preferred embodiments is represented by the Directory Information Tree (DIT) 1400 in FIG. 14. This DIT 1400 has at its top-level a domain 1410. The domain 1410 represents a logical division for managing user identities. A domain 1410 can be a company, a division within a company, a building within a division, or any other division that indicates a physical relationship. Furthermore, a domain 1410 can be strictly logical divisions, such as hourly employees and salaried employees.

Within each domain 1410 are defined Entities 1420 and Registries 1440. Entities 1420 is a container for Identifiers 1430. Identifiers 1430 uniquely identify users, and correspond to the global identifiers (or enterprise identifiers) discussed above. Identifiers 1430 correspond to human users and software processes (such as a print server) that are assigned unique local user identities in a user registry. Each identifier 1430 can include an attribute called SourceRelationships 1432 that specifies one or more local user identities in user registries that are mapped to the user.

Registries 1440 is a container that contains registries, such as system registry1 1450 and system registry2 1470. System registry1 1450 and system registry2 1470 are one type of local user registry that corresponds to a system-level registry (i.e., platform registry). System registry1 1450 contains a plurality of registry users 1460, including User1. Similarly, the application registry 1470 contains a plurality of registry users 1480, including User5. Registry users 1460 and 1480 correspond to local user identities. Each registry user 1460 and 1480 may include a target relationship 1462 and 1482 that determines which identifier 1430 corresponds to the local user identity represented by the registry user 1460 or 1480. With the EIM schema as defined by the DIT 1400 in FIG. 14, mappings can now be created that correlate a local user identity in one user registry to a local user identity in a different user registry, as shown by a specific example in FIG. 15.

Figure 15:
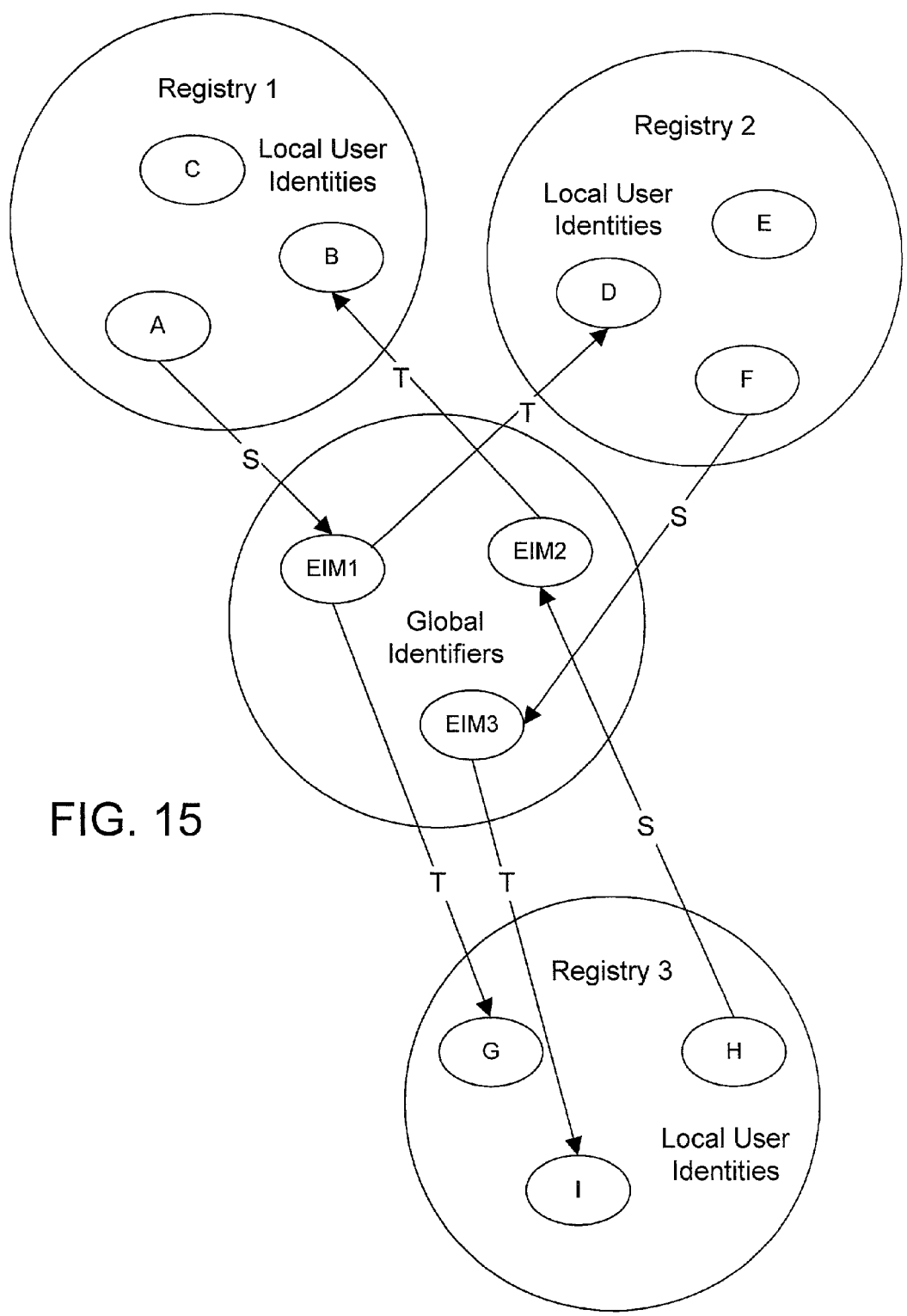
FIG. 15 is a graphical representation of user identities in different registries that are correlated together through global identities.

In FIG. 15, there are three registries, registry 1, registry 2, and registry 3. Registry 1 contains local user identities A, B and C. Registry 2 contains local user identities D, E and F. Registry 3 contains local user identities G, H and I. In the preferred embodiments, a global identifier is created for each user. Thus, we assume from FIG. 15 that EIM1, EIM2, and EIM3 are unique identifiers for three users in this domain.

The correlation between local user identities occurs by defining relationships between each local user identity and its corresponding global identifier. Note that one local user identity is not mapped directly to any other local user identity, but is mapped to a global identifier, which may be mapped to other local user identities. The preferred embodiments defines three different types of relationships between a local user identity and a global identifier: a source relationship, a target relationship, and an administrative relationship. An administrative relationship is a relationship that shows that a local user identity is associated with a particular global identifier, but cannot be used as the source, and will not be found as the target of a mapping operation. The administrative relationship is useful when administering a person's local user identities within a domain.

All identity mapping operations must occur from a local user identity through a source relationship to a global identifier, then from the global identifier through a target relationship to a local user identity. Thus, for a global identifier to be useful for a mapping operation, it must have at least one "source" and at least one "target" relationship to local user identities. If a specific local user identity has only a target relationship with a global identifier, that specific local user identity cannot be used as the source identity in a mapping operation. Similarly, a local user identity with only a source relationship with a global identifier will never be found as the result of a mapping lookup operation. However, a single local user identity within a specific user registry may have multiple types of relationships with a single global identifier. If a local user identity has both a source and target relationship with the global identifier, then it can be used as either the source, or returned as the result (i.e., target), of a mapping lookup operation.

If a local user identity has a source or target relationship with a global identifier, it is also assumed to have an administrative relationship. Separate administrative only relationships are allowed for local user identities with source and/or target relationships, but are not necessary.

While relationships between local user entities could be defined by a single type of relationship between the local user identities and the corresponding global identifier within the scope of the present invention, the preferred embodiments provides two different types of relationships (i.e., source and target) to provide more precise control over who can control the creation and management of those relationships. It is desirable, in some environments, to allow individual registry administrators to be able to control the mappings "into" a given registry (i.e., to control the creation of target relationships). Likewise it is desirable to allow a "relationship/identity mappings" administrator to control the mappings "into" the global identifiers (source relationships). To do this, the mapping information across multiple entries in the directory tree are split so that target mappings "into" a user registry are under control of the user registry itself, while the source mappings can be put under the same or different administrator's control. This split is shown by a single entry 980 in FIG. 9 mapping to both generic LDAP storage 660 as well as to a specific user registry through projection, as described above with respect to FIG. 9.

We see from the specific example of FIG. 15 that the user represented by EIM1 has a source relationship with local user identity A in Registry 1, has a target relationship with the local user identity D in Registry 2, and has a target relationship with the local user identity G in Registry 3. EIM2 has a source relationship with local user identity H in Registry 3, and has a target relationship with local user identity B in Registry 1. EIM3 has a source relationship with local user identity F in Registry 2, and has a target relationship with local user identity I in Registry 3. FIG. 15 graphically illustrates that once the identity mapping mechanism of the preferred embodiments is implemented, an administrator can define global identities and can define the relationships from the global identities to the local user identities in the user registries with great ease.

With the source and target relationships as defined herein, the source relationships are inherently more sensitive than the target relationships. If a user can create a source relationship with some person from some registry that the user controls, the user can potentially become any of the target identities associated with that person. In other words, the user can potentially compromise any data secured by any of those target user identities. On the other hand, if the user only controls target relationships for a registry, the user can only compromise the data secured using the target registry and identity.

In practice, a global identifier will likely have relatively few source relationships and a larger number of target relationships. Source relationships are preferably from registries that provide distributed authentication, such as Kerberos or digital certificates. Other registries, like AS400 registries, will most often be used as target registries, because legacy registries (like AS400) and their associated security semantics secure most of the data that exists in a domain. Unfortunately, legacy registries tend to be difficult to use for cross-platform distributed authentication. On the other hand, registries designed for distributed authentication either lack security semantics (e.g., Kerberos) or, because of their "newness", aren't currently used to secure large portions of enterprise data. This makes distributed authentication registries most useful as source identities and legacy registries most useful as target registries.

One significant advantage of the present invention is that the security semantics for each environment are maintained, yet the security information for one environment may be mapped to equivalent security information in a different environment. This capability avoids the need for a user to remember multiple identities and passwords for the different environments. Once the user is authenticated for one environment, the identity mapping mechanism of the preferred embodiments can be used to find an appropriate identity in a different user registry that is associated with the authenticated user, and impersonate the associated identity or otherwise apply the security semantics of the second user registry in order to access data protected by its security semantics.

Figures 16, 17, 18:
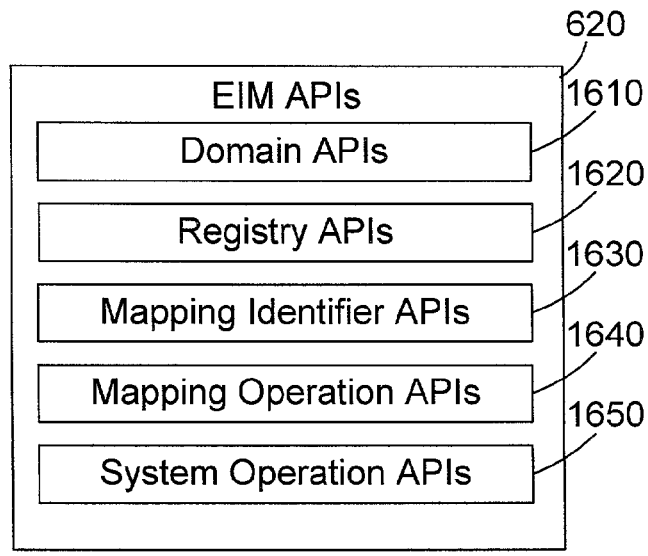
FIG. 16 is a block diagram showing APIs that are included in the EIM APIs in accordance with the preferred embodiments.
FIG. 17 is a list of sample domain APIs in accordance with the preferred embodiments.
FIG. 18 is a list of sample registry APIs in accordance with the preferred embodiments.

The EIM APIs 620 (FIG. 6) provide the programming interface for interacting with the identity mapping mechanism 610. Referring to FIG. 16, EIM APIs 620 include domain APIs 1610, registry APIs 1620, mapping identifier APIs 1630, mapping operation APIs 1640, and system operation APIs 1650. Samples of suitable APIs for each of these types are shown in FIGS. 17–21.

Examples of domain APIs 1610 are shown in FIG. 17, and include CreateDomain( ), DeleteDomain( ), ListDomains( ) and ChangeDomain( ). CreateDomain( ) is invoked to configure a platform to be a domain controller for the identity mapping mechanism 610, which is typically the first step in setting up the identity mapping mechanism 610. DeleteDomain( ) is invoked to remove the domain information for a specified domain. ListDomains( ) is invoked to provide a list of all domains that are reachable from this platform in the network. ChangeDomain( ) is invoked to make changes to attributes defined in the domain.

Examples of Registry APIs 1620 are shown in FIG. 18. AddRegistry( ) is invoked when a system-level (i.e., platform) user registry needs to be added to a domain. AddApplicationRegistry( ) is invoked to add an application user registry to the domain. RemoveRegistry( ) is invoked to remove a specified registry from the domain. ListRegistries( ) is invoked to list all registries, both system and application, within a domain. ChangeRegistry( ) is invoked to change one or more attributes defined for a registry within the domain.

Examples of mapping identifier APIs 1630 are shown in FIG. 19. AddMappingIdentifier( ) is invoked to create a global identifier within a domain. RemoveMappingIdentifier( ) is invoked to remove a global identifier from the domain. ChangeMappingIdentifier( ) is invoked to change one or more attributes defined on a global identifier. ListMappingIdentifiers( ) is invoked to list all of the global identifiers in a domain. GetMappingIdentifiers( ) is invoked to return a global identifier that corresponds to a source registry type, source registry name, and user identity that are passed as parameters to the call. The GetMappingIdentifiers( ) is the main API that is invoked to determine the global identifier for a local user identity that has a specified source relationship.

Examples of mapping operation APIs 1640 are shown in FIG. 20. AddSourceAssociation( ) is invoked to add a source relationship (association) to a global identifier. AddTargetAssociation( ) is invoked to add a target relationship (association) to a local user identity. AddAdminAssociation( ) is invoked to add an administrative relationship to either a global identifier or to a local user identity. RemoveAssociation( ) is invoked to remove the association that is specified in the parameter to the call, be it a source association, a target association, or an administrative association. ListIdentities( ) is invoked to list all local user identities that are associated with a global identifier that is specified in the call. The ListIdentities( ) API is therefore very useful for allowing system administrators to find all the local user identities associated with an individual. By knowing which local user identities correspond to a particular user, removing all of the local user identities when a user quits to join another company will be a very easy and straightforward task. Given a registry type, registry name, and user name within a source user registry, the GetTargetIdentities( ) is invoked to retrieve an associated local user identity in a specified target registry. GetTargetIdentities( ) is the API that is invoked to determine from a local user identity in one (source) user registry the corresponding local user identity in a different (target) user registry.

Examples of system operation APIs 1650 are shown in FIG. 21. JoinDomain( ) is invoked to configure a platform to point to domain controller, add its local user registry to the domain, and perform other any work that is needed to configure the local LDAP server to project the local user registry information into the LDAP directory. LeaveDomain( ) is invoked for a platform to leave a domain, and undo all changes that were made to configure the platform to join the domain. The remaining APIs in FIG. 21, namely CreateUser( ), ChangeUser( ), DeleteUser( ), RetrieveUser( ), and RetrieveUserDefinition( ) are user management operations that are used to manage local user identities in registries that have been enabled for user management. CreateUser( ) is invoked to create a local user identity using LDAP projection in a registry (e.g., AIX) according to the registryType, registryName, userName, and data specified in the call. DeleteUser( ) is invoked to delete a local user identity from a registry according to the registryType, registryName, userName, and data specified in the call. RetrieveUser( ) is invoked to retrieve data corresponding to a registryType, registryName, and userName specified in the call, passing back the data that corresponds to the requested information. RetrieveUserInformation is invoked to retrieve data regarding the definition of a user in a registry according to the registryType and registryName for a registry, with the requested data being passed back as a parameter to the call.

The specific APIs shown in FIGS. 17–21 are shown as suitable APIs in accordance with the preferred embodiments as described above, but the present invention expressly extends to any set of APIs or any other interface that provide an interface for mapping one local user identity in one user registry to a local user identity in a different user registry, and for determining the relationships between local user identities in different registries.

Figure 22:
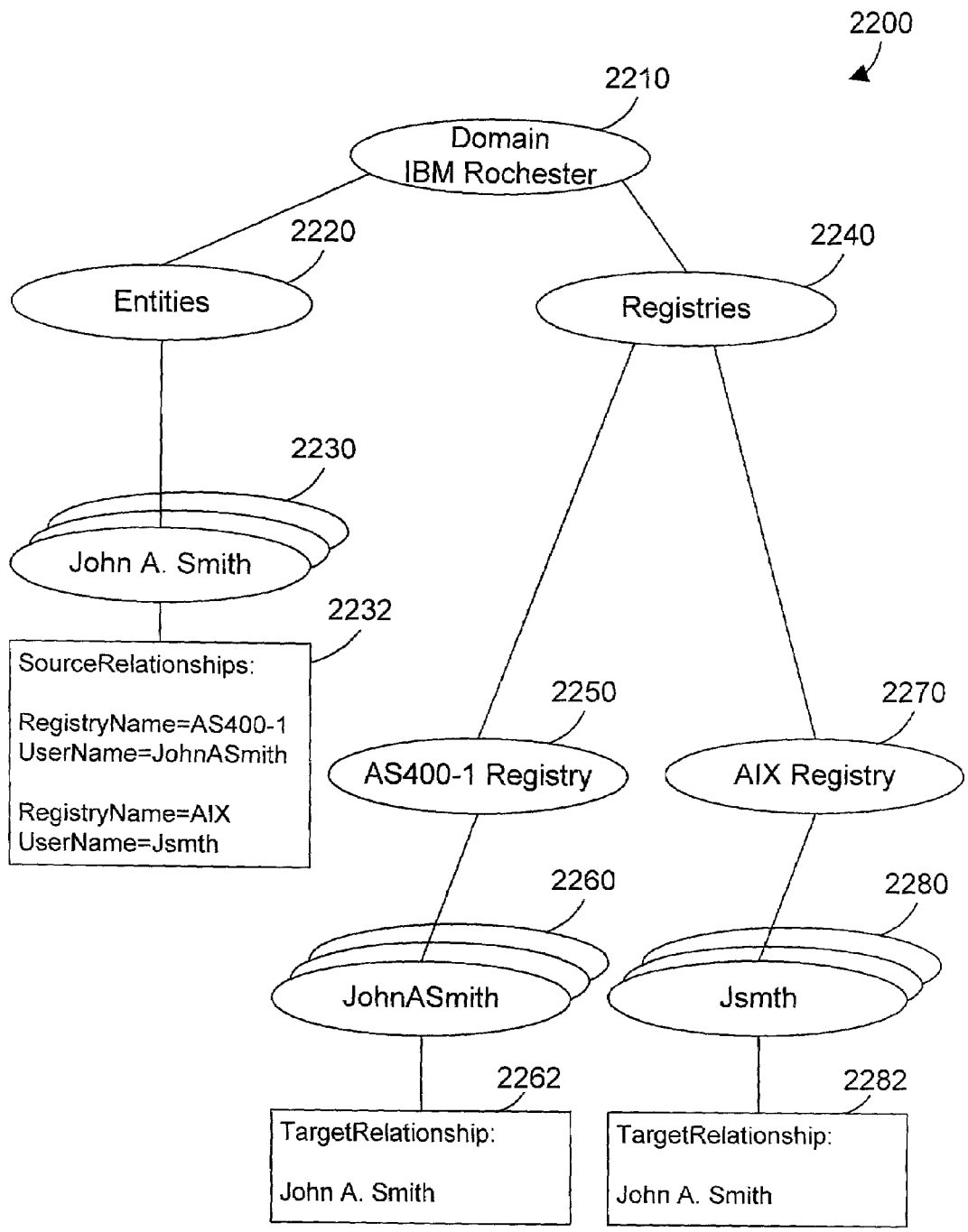
FIG. 22 is a diagram of a Directory Information Tree (DIT) that is defined by an EIM schema for a specific example that illustrates the teachings of the preferred embodiments.

An example Directory Information Tree (DIT) 2200 is shown in FIG. 22 that shows how some of the information in FIG. 10 would be represented in the identity mapping mechanism of the present invention. A domain 2210 is first defined, which we assume corresponds to IBM's facility in Rochester, Minn. The Entities 2220 is a container that holds global identifiers that corresponds to the users at IBM's Rochester, Minn. facility. We assume for this example that an employee named John A. Smith is one of the users that is employed by IBM at the Rochester, Minn. facility, and that a text identifier "John A. Smith" is used as a global identifier for this employee. DIT 2200 shows two of the specific user registries that may exist at the IBM Rochester facility, namely an AS400 registry 2250 and an AIX registry 2270. We assume that John A. Smith has a username of JohnASmith 2260 in the AS400-1 registry 2250, and that he has a username Jsmth 2280 in the AIX registry 2270. We further assume that the global identifier for this employee 2230 contains an attribute that indicates that this global identifier has a source relationship with the JohnASmith local user identity in the AS400- 1 registry 2250 and has a source relationship with the Jsmth local user identity in the AIX registry 2270, as shown in box 2232. We also assume that the local user identity JohnASmith 2260 in the AS400-1 registry 2250 includes an attribute that specifies that the local user identity JohnASmith has a target relationship with the John A. Smith global identifier. Similarly, the Jsmth local user identity 2280 in the AIX registry 2270 includes an attribute that specifies that this local user identity has a target relationship with the John A. Smith global identifier. Note that only a portion of the information in FIG. 10 is shown in the DIT of FIG. 22 for the sake of simplicity. With the Directory Information Tree 2200 thus defined as shown in FIG. 22, the EIM APIs 620 could be invoked to determine that the JohnASmith local user identity 2260 in the AS400-1 registry 2250 correlates to the Jsmth local user identity 2280 in the AIX registry 2270.

The identity mapping mechanism of the present invention provides an infrastructure for creating mappings between local user identities in different user registries on a network. In the preferred embodiment, a global identifier is created for each user, and each local user identity that corresponds to the global identifier is mapped to the global identifier. Once the relationship between the local user identities and the global identities is established, the infrastructure can then be used to determine from one local user identity a corresponding local user identity in a different user registry. The identity mapping mechanism thus allows user information in one environment to automatically retrieve user information in a different environment, thereby avoiding the necessity of the user remembering multiple usernames and passwords. Once a user it authorized to the network, and requests access to a resource, the security semantics for obtaining access to the resource may be satisfied by invoking the appropriate EIM APIs and submitting the appropriate security information. A primary benefit of the present invention is changing from an administration viewpoint that is focused on user registries with their associated user identities to an administration viewpoint that is focused on users. The result is much greater ease in administering the different user identities in different registries that correspond to a given user.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:
   at least one processor;
   a memory coupled to the at least one processor;
   first software residing in the memory and executed by the at least one processor, the first software including a first user registry that contains a first user identity for a selected user that is used to authenticate the selected user to the first software;
   second software residing in the memory and executed by the at least one processor, the second software including a second user registry that contains a second user identity for the selected user that is used to authenticate the selected user to the second software; and
   an identity mapping mechanism that provides a mapping between the first user identity and the second user identity.

2. The apparatus of claim 1 wherein the first user registry comprises a user registry in a first processing environment.

3. The apparatus of claim 2 wherein the second user registry comprises a user registry in a second processing environment that is different than the first processing environment.

4. The apparatus of claim 1 wherein the identity mapping mechanism comprises:
a directory service that contains a plurality of user identity mappings that correlate the first user identity in the first registry to the second user identity in the second registry, and that references the first and second user registries; and
schema for the directory service that specifies relationships between a plurality of entries in the directory service, where at least one entry includes the user identity mappings.

5. The apparatus of claim 4 wherein the directory service comprises Lightweight Directory Access Protocol (LDAP).

6. The apparatus of claim 1 further comprising a global identifier residing in the memory that corresponds to the selected user, and wherein the mapping comprises a first correlation between the first user identity and the global identifier and a second correlation between the second user identity and the global identifier.

7. An apparatus comprising:
at least one processor;
a memory coupled to the at least one processor;
first software residing in the memory and executed by the at least one processor, the first software including a first user registry containing a first plurality of user identities that are used to authenticate users to the first software;
second software residing in the memory and executed by the at least one processor, the second software including a second user registry residing in the memory containing a second plurality of user identities that are used to authenticate users to the second software;
a directory service that contains a plurality of user identity mappings that correlate a first user identity in the first user registry to a second user identity in the second user registry, and that references the first and second user registries; and
schema for the directory service that specifies relationships between a plurality of entries in the directory service, where at least one entry includes the user identity mappings.

8. The apparatus of claim 7 wherein the first user registry comprises a user registry in a first processing environment.

9. The apparatus of claim 8 wherein the second user registry comprises a user registry in a second processing environment that is different than the first processing environment.

10. The apparatus of claim 7 wherein the directory service comprises Lightweight Directory Access Protocol (LDAP).

11. The apparatus of claim 7 further comprising a global identifier residing in the memory that corresponds to the selected user, and wherein the mapping comprises a first correlation between the first user identity and the global identifier and a second correlation between the second user identity and the global identifier.

12. A method for managing a plurality of user identities on a plurality of computer systems coupled to a network, each user identity corresponding to a defined processing environment, the method comprising the steps of:
providing an identity mapping mechanism that provides a mapping between a first user identity in a first user registry in first software and a second user identity in a second user registry in second software, wherein the first user identity is used to authenticate a selected user to the first software and the second user identity is used to authenticate the selected user to the second software; and
invoking the identity mapping mechanism to determine the mapping between the first user identity and the second user identity.

13. The method of claim 12 wherein the identity mapping mechanism comprises:
a directory service that contains a plurality of user identity mappings that correlate the first user identity in the first registry to the second user identity in the second registry, and that references the first and second user registries; and
schema for the directory service that specifies relationships between a plurality of entries in the directory service, where at least one entry includes the user identity mappings.

14. The method of claim 13 wherein the directory service comprises Lightweight Directory Access Protocol (LDAP).

15. A method for correlating a plurality of user identities on a plurality of computer systems coupled to a network, the method comprising the steps of:
generating a global identifier corresponding to a user;
mapping a first user identity in a first user registry in first software to the global identifier, wherein the first user identity is used to authenticate a selected user to the first software; and
mapping a second user identity in a second user registry in second software to the global identifier, wherein the second user identity is used to authenticate the selected user to the second software.

16. A program product comprising:
(A) an identity mapping mechanism that provides a mapping between:
(A1) a first user identity for a selected user residing in a first user registry in first software, wherein the first user identity is used to authenticate a selected user to the first software; and
(A2) a second user identity for the selected user residing in a second user registry in second software, wherein the second user identity is used to authenticate a selected user to the second software; and
(B) computer-readable signal bearing media bearing the identity mapping mechanism.

17. The program product of claim 16 wherein the first user registry comprises a user registry in a first processing environment.

18. The program product of claim 17 wherein the second user registry comprises a user registry in a second processing environment that is different than the first processing environment.

19. The program product of claim 16 wherein the identity mapping mechanism comprises:
a directory service that contains a plurality of user identity mappings that correlate the first user identity in the first registry to the second user identity in the second registry, and that references the first and second user registries; and
schema for the directory service that specifies relationships between a plurality of entries in the directory service, where at least one entry includes the user identity mappings.

20. The program product of claim 16 wherein the directory service comprises Lightweight Directory Access Protocol (LDAP).

21. The program product of claim 16 wherein the identity mapping mechanism provides a mapping between the first user identity and the second user identity by creating a global identifier that corresponds to the selected user, and by generating a first correlation between the first user identity and the global identifier and a second correlation between the second user identity and the global identifier.

22. A program product comprising:
(A) a directory service that contains a plurality of user identity mappings that correlate a first user identity in a first user registry in first software to a second user identity in a second user registry in second software, and that references the first and second user registries, wherein the first user identity is used to authenticate a selected user to the first software and the second user identity is used to authenticate the selected user to the second software; and
(B) schema for the directory service that specifies relationships between a plurality of entries in the directory service, where at least one entry includes the user identity mappings; and
(C) computer-readable recordable media media bearing the directory service and the schema.

23. The program product of claim 22 wherein the first user registry comprises a user registry in a first processing environment.

24. The program product of claim 23 wherein the second user registry comprises a user registry in a second processing environment that is different than the first processing environment.

25. The program product of claim 22 wherein the directory service comprises Lightweight Directory Access Protocol (LDAP).

26. The program product of claim 22 wherein the plurality of user identity mappings each comprise a mapping between the first user identity and a global identifier that corresponds to the selected user, and a mapping between the global identifier and the second user identity.

27. The apparatus of claim 11, wherein the first correlation is a source relationship and wherein the second correlation is a target relationship.

* * * * *